(12) United States Patent
Cinadr et al.

(10) Patent No.: US 6,313,229 B1
(45) Date of Patent: Nov. 6, 2001

(54) BLOCKY CHLORINATED POLYOLEFINS, PROCESS FOR MAKING AND USE AS IMPACT MODIFIER COMPATIBILIZER FOR PVC OR CPVC

(75) Inventors: Bernard F. Cinadr, Brecksville; Carole A. Lepilleur, Akron; Arthur L. Backman, Brecksville, all of OH (US)

(73) Assignee: PMD Group Inc., Brecksville, OH (US)

( * ) Notice: Subject to any disclaimer, the term of this patent is extended or adjusted under 35 U.S.C. 154(b) by 0 days.

(21) Appl. No.: 09/366,934

(22) Filed: Aug. 4, 1999

Related U.S. Application Data

(62) Division of application No. 09/052,573, filed on Mar. 31, 1998, now Pat. No. 6,124,406.

(51) Int. Cl.[7] ............................... C08F 12/08; C08F 8/22

(52) U.S. Cl. .................................... 525/333.4; 525/331.2; 525/331.7; 525/332.1; 525/356; 525/214

(58) Field of Search .............................. 525/331.2, 331.7, 525/332.1, 333.4, 356, 214, 332.3

(56) References Cited

U.S. PATENT DOCUMENTS

| | | | |
|---|---|---|---|
| 2,592,763 | 4/1952 | Taylor | 260/94.9 |
| 2,890,213 | 6/1959 | Noeske | 260/94.9 |

(List continued on next page.)

FOREIGN PATENT DOCUMENTS

| | | |
|---|---|---|
| 822201 | 9/1969 | (CA) . |
| 0131937 | 1/1985 | (EP) . |
| 0343657 | 11/1989 | (EP) . |
| 0612602 | 8/1994 | (EP) . |
| 0618260 | 10/1994 | (EP) . |
| 0695782 | 2/1996 | (EP) . |
| 2381069 | 9/1978 | (FR) . |
| 1144640 | 3/1969 | (GB) . |
| 1161614 | 8/1969 | (GB) . |
| 2172289 | 9/1986 | (GB) . |
| 51138791 | 11/1976 | (JP) . |
| 584721 | 1/1983 | (JP) . |
| 7290648 | 11/1995 | (JP) . |
| 9309995 | 12/1997 | (JP) . |

OTHER PUBLICATIONS

Journal of Applied Polymer Science, vol. VI, No. 19, pp. 20–31, 1962, Canterino et al., "Chlorinated and Chlorosulfonated Polyolefins".

Polymer Engineering and Science, vol. 13, No. 3, May 1973, pp. 202–208, Paul et al., "Chlorinated Polyethylene Modification of Blends Derived from Waste Plastics Part I: Mechanical Behavior".

Polymer Engineering and Science, vol. 13, No. 4, Jul. 1973, pp. 308–318, Locke et al., "Chlorinated Polyethylene Modification of Blends Derived from Waste Plastic Part II: Mechanism of Modification".

Journal of Applied Polymer Science, vol. 33, 1987, pp. 1231–1240, Lee et al., "Properties of PVC/CPE/EPDM Polyblends".

Polymer Engineering and Science, Mar. 1987, vol. 27, No. 6, pp. 391–397, Xiande et al., "A Study on Poly(Vinyl Chloride) Blends With Chlorinated Polyethylene and Polyethylene".

Materiale Plastice, vol. 25, No. 2, pp. 77–82, Vasile et al, "Compatibility in the System Polyethylene–PVC . . . ".

Polymer Engineering and Science, vol. 28, No. 18, Sep. 1988, pp. 1167–1172, Chang et al., "Chlorinated High Density Polyethylene I. Chain Characterization".

Polymer Engineering and Science, vol. 28, No. 18, Sep. 1988, pp. 1173–1181, Chang et al., "Chlorinated High Density Polyethylene. II. Solid State Structure".

National Conference Advanced Polymer Technology, 1991, vol. 203, No. 9, pp. 203–209, Francis et al., "Chlorinated Polyethylene as a Compatibilizer for Poly(Vinyl Chloride)/Polyethylene Blend".

Polymeric Materials Science and Engineering, vol. 8, No. 5, Sep. 1992, pp. 56–60, Shu et al., "Effects of Chlorinated Polyethylene on the Theological Property of PVC/Polypropylene Blends".

Polymeric Materials Science and Engineering, vol. 8, No. 3, May 1992, pp. 57–60, Shu et al., "Morphology of Poly(Vinyl Chloride)–Polypropylene Blends".

Journal of Vinyl Technology, Mar. 1994, vol. 16, No. 1, pp. 16–20, Hofmann et al., "Plasticization of PVC With Ethylene Copolymer Resins".

(List continued on next page.)

Primary Examiner—David W. Wu
Assistant Examiner—Tanya Zalukaeva
(74) Attorney, Agent, or Firm—Thoburn T. Dunlap; Valerie L. Calloway

(57) ABSTRACT

Blocky chlorinated polyolefins are disclosed as compatibilizers of PVC and/or CPVC resins with polyolefin elastomers. The blocky chlorinated polyolefins facilitate the dispersion of the elastomers as a dispersed phase with the proper size for impact modification of the PVC and/or CPVC. The blocky chlorinated polyolefin provides better adhesion between the elastomer and the PVC and/or CPVC providing better physical properties such as impact strength as measured by Notched Izod and variable height impact testing (VHIT) than did the randomly chlorinated polyolefins, often used as processing aids and as impact modifiers in PVC or CPVC. The differences in properties achieved with blocky chlorinated polyolefins versus randomly chlorinated polyolefins are attributed to the individual blocks of the blocky polyolefin being compatible (and/or co-crystalizable) with either the polyolefin elastomer or the PVC/CPVC resulting in better adhesion between phases. Also disclosed is a process for making optimal blocky chlorinated polyolefins.

7 Claims, 1 Drawing Sheet

U.S. PATENT DOCUMENTS

| | | | |
|---|---|---|---|
| 2,913,449 | 11/1959 | Hoerger et al. | 260/94.9 |
| 2,928,819 | 3/1960 | Noeske | 260/94.9 |
| 3,085,082 | 4/1963 | Baer et al. | 260/45.5 |
| 3,396,211 | 8/1968 | Bonotto | 260/897 |
| 3,454,544 | 7/1969 | Young et al. | 260/88.2 |
| 3,563,974 | 2/1971 | Eckardt et al. | 260/94.9 |
| 3,585,117 | 6/1971 | Gresser et al. | 204/159.18 |
| 3,621,080 | 11/1971 | De Coene | 260/897 |
| 3,940,456 | 2/1976 | Frey et al. | 260/897 |
| 4,180,529 | 12/1979 | Hofmann | 525/85 |
| 4,197,386 | 4/1980 | Schoen | 525/356 |
| 4,234,703 | 11/1980 | Lindsay | 525/211 |
| 4,425,602 | 1/1984 | Hutchinson | 204/159.18 |
| 4,652,616 | 3/1987 | Kamiya et al. | 525/331.7 |
| 4,751,147 | 6/1988 | Stephens et al. | 428/523 |
| 4,767,817 | 8/1988 | Lee | 524/494 |
| 5,229,456 | 7/1993 | Ilenda et al. | 525/66 |
| 5,234,993 | 8/1993 | Huynh-Ba | 525/66 |
| 5,270,381 | 12/1993 | Yamanaka et al. | 524/569 |
| 5,308,894 | 5/1994 | Laughner | 523/436 |
| 5,338,803 | 8/1994 | Sun et al. | 525/309 |
| 5,340,880 | 8/1994 | Backman et al. | 525/331.6 |
| 5,352,735 | 10/1994 | Hofmann | 525/63 |
| 5,387,648 | 2/1995 | Ainsworth | 525/192 |
| 5,446,064 | 8/1995 | Hori et al. | 524/536 |
| 5,457,146 | 10/1995 | Ogoe et al. | 524/409 |
| 5,460,818 | 10/1995 | Park et al. | 426/415 |
| 5,464,903 | 11/1995 | Hofmann | 525/185 |
| 5,478,887 | 12/1995 | Huynh-Ba | 525/66 |
| 5,502,111 | 3/1996 | Huynh-Ba | 525/239 |
| 5,525,651 | 6/1996 | Ogoe et al. | 523/436 |
| 5,525,679 | 6/1996 | Effler, Jr. et al. | 525/334.1 |

OTHER PUBLICATIONS

Polymeric Materials Science and Engineering, vol. 10, No. 1, Jan. 1994, pp. 28–32, Zheng et al., "Preparation and Mechanical Properties of PVC/EPDM Alloy".

Chinese Journal of Applied Chemistry, vol. 13, No. 5, pp. 52–55, Oct. 1996, He et al., "Effect of Solid State Chlorinated Polyethylene On Properties and Morphology of PVC/LLDPE Blends".

Curve A: $\%\Delta H_R = -0.097 \ast (\%Cl) + 100$

Curve B: $\%\Delta H_R = -0.068 \ast (\%Cl)^2 + 2.59 \ast (\%Cl) + 73.71$

Curve C: $\%\Delta H_R = 0.029 \ast (\%Cl)^2 - 3.45 \ast (\%Cl) + 141.56$

Curve B+1%: $\%\Delta H_R = -0.068 \ast (\%Cl)^2 + 2.59 \ast (\%Cl) + 74.71$

Curve B+2%: $\%\Delta H_R = -0.068 \ast (\%Cl)^2 + 2.59 \ast (\%Cl) + 75.71$

Curve B+5%: $\%\Delta H_R = -0.076 \ast (\%Cl)^2 + 3.16 \ast (\%Cl) + 68$

BLOCKY CHLORINATED POLYOLEFINS, PROCESS FOR MAKING AND USE AS IMPACT MODIFIER COMPATIBILIZER FOR PVC OR CPVC

CROSS REFERENCE TO RELATED APPLICATION

This application is divisional application of U.S. application Ser. No. 09/052,573, which was filed on Mar. 31, 1998 now U.S. Pat. No. 6,124,406.

FIELD OF INVENTION

Post chlorinated polyvinyl chloride (CPVC) and/or polyvinyl chloride (PVC) can use a blocky chlorinated polyolefin to compatibilize them (PVC or CPVC) with a polyolefin rubber. The blend of PVC and/or CPVC with the blocky chlorinated polyethylene and polyolefin rubber (elastomer) can have a combination of good impact resistance, high heat distortion temperature (relative to the base CPVC or PVC), good tensile properties, oxidation resistance, and stability to ultraviolet light (UV) exposure. A process is disclosed for block chlorinating polyolefins (e.g. polyethylene) without appreciably swelling the polyolefin or melting the crystalline phase. The process produces a polymeric product having both high chlorine content blocks (e.g. up to 50–75 wt. % chlorine) and relatively non-chlorinated crystallizable polyolefin blocks. The resulting polymer is characterized as blocky. Said crystallizable polyolefin blocks are generally part of the same polymer that is chlorinated. The two different blocks can compatibilize a CPVC or PVC with a polyolefin rubber.

BACKGROUND OF INVENTION

Polyolefins have been chlorinated in the past. Randomly chlorinated polyethylenes (e.g. Tyrin™ from Dow Chemical) have been used in PVC or CPVC blends, generally as a processing aid and impact modifier. The chlorinated polyethylenes used in PVC or CPVC blends have been randomly (relatively homogeneously) chlorinated by using a swelling solvent and/or a chlorinating temperature above the crystalline melting temperature of the polyethylene. Traditionally those who chlorinated polyethylene wanted to eliminate the crystalline polyethylene phase by chlorinating the crystallizable polyethylene segments, which inhibits or prevents further crystallization of the polyolefin. Residual crystalline fractions in a chlorinated polyethylene would require a processing temperature above the melting point while amorphous polyethylene fractions can be processed at a lower temperature. The use of higher chlorination temperatures and swelling solvents (which decrease residual crystallinity) also increase the rate of the chlorinating reaction, thus reducing costs. It has even been postulated that highly crystalline polyethylene would not be effectively chlorinated unless either it was heated above the crystalline melting temperature or the crystallinity was reduced by using a swelling solvent.

Two articles were published in Polymer Engineering and Science, vol. 28 pp. 1167–1172 and 1173–1181, which tried to compare and contrast homogeneously chlorinated polyethylene and their blocky chlorinated polyethylene. The chlorination time for the blocky chlorinated polyethylene was continued through 20 hours. The authors postulated that during chlorination the crystalline polyethylene surfaces were chlorinated, converting them to amorphous chlorinated material. They observed that the melting point of the crystalline polyethylene was a function of crystalline thickness and the heat of melting ($\Delta H$) of the polyethylene decreased after about 20 wt. % chlorine was added. The crystalline thickness was limited after chlorination by the number of successive non-chlorinated methylene repeat units.

Various conventional impact modifiers have been used with PVC and CPVC such as ABS or MBS impact modifiers. Use of these impact modifiers can reduce other desirable properties of the PVC or CPVC such as heat distortion temperature, thermal stability, oxidation resistance, tensile strength and stability to ultraviolet (UV) light exposure. There have been neither publications nor commercial products (except for graft copolymers) that disclose or include polymers prepared by polymerizing blocks of two different monomers to use to compatibilize PVC or CPVC with polyolefins. There is a continuing need for a copolymer to improve the interaction of PVC and/or CPVC with polyolefin elastomers.

SUMMARY OF INVENTION

Chlorinated polyolefins (e.g. polyethylenes) can be prepared having from about 10 or 20 to about 60 wt. % bound chlorine based on the weight of the chlorinated polyolefin (e.g. polyethylene) and having from about 20 to about 99 wt. % residual crystallizable polyolefin (e.g. polyethylene) blocks and having a peak melting temperature from about 110 to about 140° C. wherein said wt. % residual crystallizable blocks are expressed as a percentage based on the weight of crystallizable polyolefin in the polymer before chlorination. Such chlorinated polyolefins (e.g. polyethylenes) can be prepared by a chlorination process from semi-crystalline polyolefin which comprises reacting the semi-crystalline polyolefin in a generally unswollen state at a temperature below its crystalline melting temperature with chlorine for a short period of time. Depending on the reaction conditions chosen (mostly time, chlorine pressure, and temperature), a free radical source, a catalyst, and/or UV radiation may be useful. When the reaction conditions are suitable for quick chlorination, then the amorphous portion of the polyolefin is highly chlorinated while the crystalline portion of the polyolefin is not significantly converted to amorphous chlorinated polyolefin.

Interfacial agents such as the blocky chlorinated polyethylene can improve the dispersibility of polyolefin elastomers in PVC and/or CPVC and improve the adhesion between the polyolefin elastomer phase and the PVC and/or CPVC. While applicants disclose a preferred method for preparing blocky chlorinated polyethylenes, it is anticipated that any blocky chlorinated polyolefin with significant residual crystallinity and with at least 10 wt. % bound chlorine will have some desirable compatibilizing of PVC and/or CPVC with polyolefin rubbers. The crystalline polyolefin blocks of the chlorinated polyolefin associate with and maybe even co-crystallize, as shown by differential scanning calorimetry (DSC), with segments from the polyolefin rubber while the amorphous chlorinated blocks of said chlorinated polyolefin associate with the PVC and/or CPVC.

DETAILED DESCRIPTION OF THE INVENTION

Figure 1:
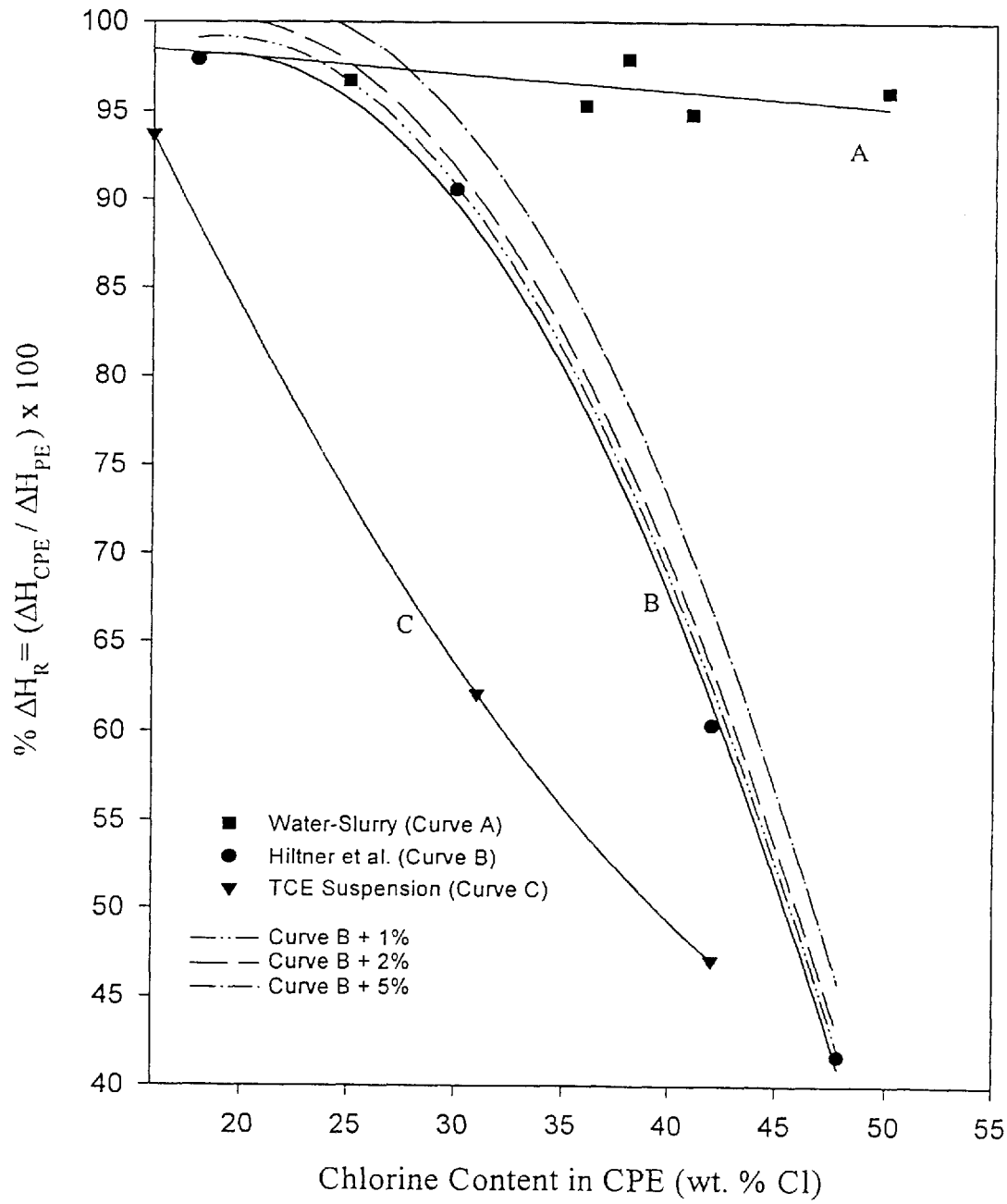
FIG. 1 illustrates the residual crystallinity of chlorinated polyethylenes by two different chlorination methods with additional data from a TCE solvent method taken from a journal article. Curve A is by the method of this disclosure, curve B is data from the journal, and curve C is the applicants' attempt to reproduce the method of the journal article.

Blocky chlorinated polyolefins can be used to compatibilize polyolefin elastomers with polyvinyl chloride (PVC)

and/or chlorinated polyvinyl chloride (CPVC). The purpose of compatibilizing a polyolefin elastomer with PVC or CPVC is to form a dispersed polyolefin elastomer phase in the PVC or CPVC which can impart impact modification (act as impact modifier) to the PVC or CPVC resin without unduly detracting from thermal stability, modulus, tensile strength, heat distortion temperature, weatherability and chemical resistance of the compounded PVC or CPVC resin. Preferred compatibilizers will also improve adhesion between phases (a deficiency of randomly chlorinated polyolefins). The resulting PVC or CPVC compound can be used for generally any application (e.g. vinyl siding, sheathing, tubing or pipe, molded articles, etc.). The simple polyolefin elastomers have little detrimental effect on the physical properties of the PVC or CPVC and can greatly enhance the impact strength when the correct compatibilizer or compatibilizers are present in the proper amount and properly blended into PVC or CPVC. Some important characteristics are the size of the dispersed polyolefin elastomer phase and the interfacial adhesion of the polyolefin elastomer phase to the PVC and/or CPVC.

Typically, blends of immiscible polymers exhibit a coarse and unstable phase morphology with poor interfacial strength. The resulting poor mechanical properties can be improved with a small amount of an interfacial agent. The compatibilizing agent may be a graft or block copolymer added as a third polymeric component. Such agent can reduce the size of the dispersed phase, stabilize the phase morphology against coalescence and increase interfacial adhesion between the dispersed and continuous phases. There are two current interfacial models. The core-shell model wherein the block or graft copolymer absorbs mainly onto the phases in an interfacial layer; and the interpenetration model wherein each sequence of the copolymer penetrates its homopolymer phase and provides effective entanglements and/or co-crystallization. The particular mechanism by which an individual compatibilizing agent functions, depends upon the molecular architecture of the compatibilizing agent (i.e. compatibilizer molecule), especially its arrangement and the chemical composition of the blocks or segments that are miscible, or at least compatible, with each phase.

It is anticipated that block chlorinated polyolefins can function as compatibilizers for polar chlorine-containing polymers and non-polar polyolefin elastomers by either mechanism. Important to which mechanism predominates and the effectiveness of the compatibilizing agent are the chlorine content of the chlorinated block, the amount of residual polyethylene crystallinity and the length of the methylene sequences in the polyolefin elastomer. Some blocky chlorinated polyethylenes of this disclosure with high residual polyethylene crystallinity can co-crystallize with segments from the polyolefin elastomer (interpenetration model) based on interpretation of the DSC data. Other blocky chlorinated polyolefins mainly absorb onto the phases in an interfacial layer (core-shell model) based on interpretation of transmission electron micrographs (TEM).

The compatibilizers are prepared by a chlorinating process at low temperatures such that a substantial portion of the crystalline polyolefin (e.g. polyethylene) is still crystalline and less effectively chlorinated than the amorphous portion of the polyolefin. This results in a blocky polymer as each polymer chain usually has both crystalline and amorphous portions. When the crystalline regions are melted and blended with PVC or CPVC they have been found to recrystallize in the PVC or CPVC compositions and form a dispersed phase, which is compatible with and often is co-crystallizable with the polyolefin rubber which often has crystallizable polyethylene or polypropylene segments.

The semi-crystalline polyolefin precursor to the chlorinated polyolefin has desirably at least 20 or 30 wt. %, more desirably at least 45 wt. % and preferably at least 50 wt. % crystalline polyolefin portions. Unless otherwise defined later wt. % crystallinity will be measured by DSC on as prepared samples of the polyolefin using a heating rate of 10° C./min and starting at −150° C. and ending at 250° C. For the purpose of calculations the heat of melting (ΔH) of 100 wt. % crystalline polyethylene by DSC will be 290 joules/g. For the chlorinated polyolefins the sample weight for ΔH measurements will exclude the weight of bound chlorine.

The polyolefin is desirably at least 85, more desirably at least 90 and preferably at least 95 mole % or at least 98 mole % repeat units from monoolefins of 2 to 10 carbon atoms. Preferably the repeat units of the polyolefin are from alpha-monoolefins having from 2 to 4 carbon atoms, more preferably ethylene or propylene, and most preferably ethylene. The polyolefin can be prepared with any polymerization scheme but Ziegler-Natta, Phillips, and metallocene catalysts are preferred as they result in high weight percentages of crystallinity. The residual of the repeat units of the polyolefin can be other copolymerizable monomers. These will vary with the polymerization catalyst. Preferably the polyolefins have densities at 25° C. of from about 0.93, or 0.94 to about 0.965, 0.97 or 0.98 g/cc. Desirably they have crystalline melting temperatures from about 110–140° C. or 124° C. to about 130, 135 or 140° C. and melt index values (ASTM D-1238 FR-E) of from about 0.01 to 40, about 0.05 to 20 preferred, and about 0.1 to 10 most preferred.

Studies of other systems have shown that the usefulness of di-block copolymers as compatibilizer in polymer blends depends more on their molecular structure rather than their block length. However block length must be sufficient to anchor them firmly into and/or onto the separate phases to provide sufficient interfacial adhesion. Most melt-blending processes involve short processing times, therefore very long blocks may be ineffective because of their very low diffusion rates.

The chlorination procedure can be done in any media, preferably water, which does not appreciably swell the polyolefin (e.g. less than 10% increase in volume due to equilibrium swelling of the precursor polyolefin at 25° C. with the media and preferably less than 5 volume % increase). The chlorination temperature is desirably less than 100° C. and more desirably from about 40 to about 90 or 100° C. and preferably from about 50 to about 70 or 80° C. The chlorination media can be a liquid at the chlorination conditions (temperature, pressure, etc.) or a gas. The polyolefin is desirably in a particulate form with average particle size desirably from about 20 to about 500 μm. The chlorine can be added as a gas or a liquid and can be at pressures from about 5 or 10 pounds per square inch absolute (psia) to several hundred psia, and is preferably from about 15 to about 90 psia and most preferably from about 50 to about 90 psia. Desirably any oxygen which may be in the reactor or with the polyolefin is removed prior to chlorination. The amount of chlorine added can be determined in both systems by weight difference measurements either on the reactor or on the chlorine source. Alternatively or additionally the chlorine can be metered in.

Depending on the chlorination temperature it may be desirable to provide a free radical source, a catalyst, or ultraviolet radiation (UV) to accelerate the reaction. Example of free radical sources include organic peroxyesters. Example of catalysts include oxygen. Examples of UV radiation include any light source capable of providing radiation in the UV range. These free radical sources, catalysts, and UV sources are well known to the chlorination art and the type, amount, and optimization of use are available in numerous patents and publications on chlorinating polymers in general and more particularly chlorinating polyvinyl chloride and polyethylene. The difference between the prior art and the process of this disclosure is the chlorination speed, general absence of swelling solvents, and low temperature. After the chlorination is finished the chlorinated polyolefin is recovered from the media. Any byproducts (e.g. HCl, etc.) can be removed or neutralized along with the removal of the excess chlorine, if any. Then the chlorinated polyethylene can be washed and dried in conventional manner.

The chlorinated polyolefin desirably has a chlorine content from about 10, 20, 25, 27, 30, or 35 wt. % bound chlorine to about 50, 55, or 60 wt. % chlorine. Generally, the lower chlorine content chlorinated polyolefins are preferred compatibilizers for PVC and the higher chlorine content chlorinated polyolefins are preferred compatibilizers for high chlorine content CPVC. Intermediate chlorine content chlorinated polyolefins are preferred for intermediate chlorine content CPVC. Desirably the chlorinated polyolefin has at least 20, 30, 40, or 50 wt. % and more preferably from about 40, 50, 60, 70 or 80 to about 70, 80, 90, 95, or more wt. % residual crystallinity. The percent residual crystallinity is the crystallinity of the chlorinated polyolefin corrected for the chlorine content, expressed as a percentage of the crystallinity of the polyolefin precursor. A more detailed description and example calculations follow later. Desirably the crystalline phase has a melting temperature similar to the starting polyolefin (e.g. about 110, 120 or 124° C. to about 130, 135, or 140° C.). Desirably the blocky chlorinated polyolefin retains at least 10, 12, 15, or 20 wt. % blocks of crystalline polyolefin based on the weight of the chlorinated polyolefin less the weight of the bound chlorine atoms.

The polyvinyl chloride (PVC) is desirably a polymer or copolymer having at least 70 wt. % repeat units from vinyl chloride and up to 30 wt. % repeat units from other copolymerizable monomers. These polymers are well known to the art and are commercially available. Desirably the PVC is at least 80 or 90 wt. % repeat units from vinyl chloride with the residual of up to 10 or 20 wt. % being copolymerizable monomers. Comonomers include alkyl-acrylates, vinyl acetate, acrylonitriles, styrene etc. Generally PVC has a Vicat B softening temperature (ASTM D-1525) of about 75 to about 120° C. and is processed from about 170 to about 200° C. Desirably the PVC has an inherent viscosity as measured by ASTM D-1234-66 from about 0.4 to about 1.6, more desirably from about 0.5 to about 1.6 and a density from about 1.3 to about 1.4 g/cm$^3$.

The chlorinated polyvinyl chloride (CPVC) is also known to the art and readily commercially available. Desirably it has a chlorine content from about 57, 59, 63, or 65 wt. % to about 71, 73, or 74 wt. %. Desirably it has been prepared from a PVC having an inherent viscosity of from about 0.5 or 0.6 to about 1.2. The inherent viscosity of the CPVC, although harder to measure than that of PVC, is generally the same as the precursor PVC. CPVC is often made in solution process, fluidized bed process, water-slurry process, thermal process, or a liquid chlorine process. The CPVC resins generally have a glass transition temperature of at least 10° C. higher than the glass transition temperature of the PVC resin from which they were made. Desirably the PVC from which the CPVC was made had at least 95 wt. % repeat units from vinyl chloride.

As is practiced in the art the PVC resin can be blended in a variety of proportions with the CPVC resin to prepare polymer compositions with intermediate properties (such as softening temperature) to those of PVC or CPVC. These blends may also be impact modified by the blocky chlorinated polyolefins and polyolefin elastomers of this disclosure.

The polyolefin elastomers useful herein generally have at least 90 or at least 95 wt. % repeat units from two or more olefin monomers, more desirably two or more alpha-monoolefin monomers. The olefin monomers of interest have from 2 to 10 carbon atoms and more desirably from 2 to 4, 6 or 8 carbon atoms. Desirably the weight ratio of repeat units of the first olefin to the repeat units of the second olefin is from about 20:80 to about 80:20. These ratios are sufficient to minimize the formation of crystalline phases so that a rubbery polymer is obtained. The preferred polyolefin elastomer is an ethylene copolymer having from about 50 to 85 wt. % repeat units from ethylene and about 15 to about 50 wt. % repeat units from a different alpha-monoolefin having from 3 to 10 carbon atoms. Examples include ethylene-propylene (EPR), ethylene-butene, ethylene-hexene, and ethylene-octene copolymers available from various suppliers selected from Dow, DSM, Bayer, Uniroyal, Union Carbide and Exxon. Optionally the ethylene copolymer may have up to 10 wt. % or from about 0.1 to about 10 wt. % repeat units from a nonconjugated polyunsaturated linear or cyclic olefin of 5 to 20 carbon atoms. An example of an ethylene copolymer having said repeat units from a polyunsaturated linear or cyclic olefin is ethylene-propylene-diene rubber (EPDM). Examples of the polyunsaturated olefin include dicyclopentadiene, substituted norbornenes, and 1,4 or 1,5 hexadiene. The polyolefin elastomers generally have a Mooney viscosity ML 1+4@ 125° C. (ASTM D-1646/ISO 289) of from about 5 to 150 preferably 10 to 70. Generally lower viscosity rubbers are preferred for the lower viscosity PVC compounds and higher viscosity rubbers are preferred for the higher viscosity CPVC compounds.

Randomly chlorinated polyolefins can be used in the PVC and/or CPVC compositions to impart particular characteristics (e.g. aid fusion and dispersion and enhance impact strength). Dow Chemical sells Tyrin™, a randomly chlorinated polyethylene, specifically for inclusion with PVC and CPVC. The Tyrin™ products typically have between 0 and 25 wt. % residual crystallinity from the starting polyethylene. Chlorinated polyolefins, e.g. polyethylene, can have densities below that of the polyolefin e.g. 0.91 to 0.98 g/cc or above that of the polyolefin e.g. 1.00 to 1.4 g/cc depending on the chlorine content. The addition of a small amount of chlorine randomly along the entire polymer chain disrupts the crystallinity. Since the crystalline portions are denser than the amorphous regions this lowers the density. Due to the dense nature of chlorine the addition of more chlorine pushes the density of chlorinated polyolefins up above 1 to about 1.4 g/cc when chlorine atoms are present in sufficient amount. Randomly chlorinated polyolefins have lower heat of melting than blocky chlorinated polyolefins.

The amounts of the blocky chlorinated polyolefins and polyolefin rubbers in the PVC and/or CPVC compounds is traditionally based upon 100 parts by weight of the base PVC and/or CPVC resin. The amount of the blocky chlorinated polyolefin (b-CPE) is desirably from about 0.5 to about 10 parts by weight, more desirably from about 0.5 to about 5 parts by weight. The amount of the polyolefin elastomer (POE) is desirably from about 1 to about 15 or 20 parts by weight and more desirably from about 1 to about 10 parts by weight. The amount of the randomly chlorinated polyolefin, if present, is desirably from about 0.1 or 0.5 to about 10 parts by weight and more desirably from about 0.5 to about 5 parts by weight.

PVC and/or CPVC can be compounded with a wide variety of other ingredients to increase processability and other properties of the in-process or finished (molded or shaped) article. Thermal stabilizers are beneficial and include for example di-butyl tin compounds in amounts from about 1 to about 5 parts by weight per 100 parts PVC and/or CPVC. Other stabilizers may include metal salts of phosphoric acid, polyols, or epoxidized oils. These can be used in amounts from about 0.1 to about 7 parts by weight. Lubricants such as paraffin waxes, low molecular weight polyethylene, oxidized polyethylenes, fatty acids and their salts, fatty alcohols, metal soaps, fatty amides, fatty esters, can be included in PVC and/or CPVC compounds. Viscosity modifiers such as Paraloid™ K 120 ND from Rohm and Haas can be added. Fillers are optional and include clay, silica, wollastonite, mica, barytes, calcium carbonate, titanium dioxides, and talc.

The method of compounding is straightforward as any high intensity method known to uniformly mix and fuse the components into a homogeneous compound such as a Banbury mill, followed by sheeting, slitting or extrusion into pellets or cubes can be used. The differences in processing and handling of CPVC compared with PVC relate mainly to the temperature and viscosity differences and care to avoid too much work and shear burning. Alternatively a twin screw extruder or other effective high shear mixer may be substituted for one or more of the above steps.

A characteristic property of the blocky chlorinated polyethylenes synthesized by this process is their substantial remaining crystallinity which was measured by thermal analysis, i.e, by differential scanning calorimetry (DSC). As is known, DSC, as described in "Textbook of Polymer Science" by Fred Billmeyer (second edition, page 121), is a technique in which the temperature of a reference substance and a sample are measured and controlled to conform to a predetermined time-temperature program. At the same time, temperature differences which develop between the reference and the sample, especially when the sample undergoes a thermal transition, are compared and the heat input in both the reference or the sample is adjusted to maintain equal temperatures. A signal proportional to these power differences is then plotted. The area under the resulting curve is a direct measure of the heat of transition. The percent crystallinity of the blocky chlorinated polyethylenes can be quantitatively estimated by comparing the area under the peak corresponding to the heat of melting, divided by the area under the peak corresponding to the heat of melting of a standard sample of known crystallinity. For the purpose of calculations 100 wt. % crystalline polyethylene will be assigned a heat of melting ($\Delta H$) of 290 joules/gram. The residual crystallinity of the chlorinated polyethylenes herein cited can be estimated using the ratio of the corrected heat of melting (enthalpy of fusion) of the as prepared chlorinated samples (i.e., corrected so to be estimated per gram of polyethylene by subtracting the weight of bound chlorine from the sample weight) over the enthalpy of fusion of the starting polyethylene (%$\Delta H_R$ of residual polyethylene crystallinity).

An example of the calculation for the residual polyethylene crystallinity of a chlorinated polyethylene is as follow:

The enthalpy of fusion ($\Delta H$) for a chlorinated polyethylene, containing 25 wt. % chlorine (about 75 wt. % polyethylene) was measured by DSC and found to be $\Delta H_{CPE\ uncorrected}$=117 J/g. So the enthalpy of fusion per gram of polyethylene (corrected for the weight of chlorine) will be $\Delta H_{CPE}$=117/0.75 or $\Delta H_{CPE}$=156 J/gPE. The enthalpy of fusion of the starting polyethylene before chlorination was found to be $\Delta H_{PE}$=161 J/g. So the residual polyethylene crystallinity can be calculated as being the ratio 156/161 or about 0.97, i.e. 97% of residual polyethylene crystallinity. This shows that essentially only the amorphous polyethylene phase was chlorinated.

Chlorine content of the blocky chlorinated polyethylenes (b-CPE) were measured by $^{13}$C-NMR. Approximately 10 wt. % of b-CPE is dissolved in 1,2,4-trichlorobenzene. Benzene-d6 is added at about 10% by volume of the total solvent for the deuterium lock. One drop of hexamethyidisiloxane is added as a chemical shift reference. Carbon-13 data is collected with overnight data accumulation using conditions such as, 110° C. measurement temperature, total delay time between pulses of 7.5 seconds, 90° C. Carbon-13 pulse and a composite pulse decoupling (CDP) with no corrections for Nuclear Overhauser Effect (NOE) differences.

EXAMPLES

Example 1

Chlorinated Polyethylene from UV Irradiation

A 2-gallon jacketed reactor (suitable for chlorination reactions) provided with means of agitation, feed lines, pressure and temperature recording instruments, and appropriate valves and piping was charged with 4000 g of demineralized water, 0.3 g of a commercial wetting agent (Thompson-Hayward T-DET-N8) and 300 g of high density polyethylene powder (Microthene™ FA700-00 from Quantum Chemical Corporation), having a density of 0.953 g/cm$^3$ as measured by ASTM D-1505 on compression molded samples and a melt index of 10.5 g/10 min according to ASTM D-1238 FR-E. Microthene™ powder particles, which are spherical with an average particle size of ca. 20 $\mu$m, were slurried in water. After evacuation to 6 psia (pounds per square inch absolute), nitrogen was charged to the reactor until the pressure reached 104 psia. The reactor was again evacuated to 6 psia and nitrogen was added until the pressure was 102 psia. The reactor was again evacuated to 6 psia. The temperature was then increased to 50° C. Chlorine was added until the pressure in the reactor reached 28 psia. The reactor was evacuated to 9 psia and chlorine was added to 30 psia. The reactor was then evacuated to 10 psia. The agitation was started at ca. 500 rpm. Liquid chlorine was added until the pressure reached 50 psia. The reaction was initiated by the presence of free radicals generated via UV irradiation. Chlorine was fed such as to maintain a constant reaction temperature and pressure throughout the reaction (50° C. and 50 psia). The total volume of liquid chlorine added was 400 cm$^3$. After the completion of chlorine addition, the temperature was maintained at 50° C. with the UV light still turned on. After 190 minutes, the pressure dropped to 7 psia, indicating the reaction was complete. The polymer was removed from the slurry and given multiple extractions with hot water until all the acid was removed. The product was dried in a vacuum oven at 50° C. The chlorine content was measured by $^{13}$C-NMR as described previously and found to be 50 wt. % chlorine. The residual crystallinity was measured by DSC according to the above outlined Thermal Analysis (TA) test procedure (ASTM D-3417) and found to be at least 70% of the starting polyethylene crystallinity.

Example 2
Chlorinated Polyethylene from UV Irradiation

Essentially the procedure of Example 1 was used. 300 g of a high density polyethylene pellets (HDPE 9602) purchased from Chevron Chemical, having a density of 0.960 g/cm$^3$ (ASTM D-4683) and a melt index of 0.25 g/10 min (ASTM D-1238 FR-E) were cryogenically ground to an average particle size of ca. 250 $\mu$m and then charged into the reactor. The total volume of chlorine fed was 250 cm$^3$. The chlorination was completed in 120 minutes. The chlorine content was measured by $^{13}$C-NMR as described previously and found to be 38 wt. % chlorine. The residual crystallinity was measured by DSC according to the above outlined TA test procedure (ASTM D-3417) and found to be ca. 98% of the starting polyethylene crystallinity.

Example 3
Chlorinated Polyethylene from Oxygen Catalyst

Essentially the procedure of Example 2 was used except a trace amount of oxygen was used as the catalyst (by skipping a vacuum purging step) for the chlorination rather than UV irradiation. The reaction temperature was 70° C. and 300 g of a high density polyethylene powder (HDPE 9602) was charged into the reactor. The total volume of chlorine fed was 170 cm$^3$. The chlorination was completed in 240 minutes. The chlorine content was measured by $^{13}$C-NMR as described previously and found to be 30 wt. %.

The residual crystallinity was measured by DSC according to the above outlined TA test procedure (ASTM D-3417) and found to be ca. 93% of the starting polyethylene crystallinity.

Example 4
Chlorinated Polyethylene Using a Peroxide Free Radical Source

Essentially the procedure of Example 2 was used except 0.5 g of an organic peroxide, t-butylperoxyneodecanoate (Lupersol™ 10 M-75) was used to initiate the chlorination. The reaction temperature was 70° C. and 300 g of high density polyethylene powder (HDPE 9602) was charged in the reactor. The total volume of chlorine fed was 170 cm$^3$. The reaction was completed in 320 minutes. The chlorine content was measured by $^{13}$C-NMR as described previously and found to be 27 wt. %. The residual crystallinity was measured by DSC according to the above outlined TA test procedure (ASTM D-3417) and found to be ca. 99% of the starting polyethylene crystallinity.

Examples 1–4 illustrate that UV irradiation, oxygen catalyst, and peroxide free radical sources can promote the desired chlorination and the process can have residual crystallinity of 70, 98, 93, and 99 wt. % (retaining this percentage of the original crystallinity (the sample weight for the $\Delta H_{CPE}$ was corrected by subtracting the weight of bound chlorine atoms on the chlorinated polyethylene)).

Example 5
Chlorinated Polyethylenes, Effect of Process Variables on Rates and Residual Crystallinity Essentially the procedure of Example 2 was used. 300 g of a high density polyethylene (HDPE 9708) purchased from Chevron Chemical, having a density of 0.962 g/cm$^3$ (ASTM D-4683) and a melt index of 8.0 g/10 min (ASTM D-1238 FR-E) was cryogenically ground to the desired average particle size (ca. 250 and 500 $\mu$m) and charged into the reactor. Polyethylene powder, Microthene™ FA-700-00 from Quantum Chemical, having a density of 0.953 g/cm$^3$ (ASTM D-4683) and a melt index of 10.5 g/10 min (ASTM D-1238 FR-E)-and having an average particle size of 20 $\mu$m was also used. The total volume of chlorine fed was 400 cm$^3$. In each case, both the chlorine content was measured by $^{13}$C-NMR as described previously, and the enthalpy of fusion (i.e. corresponding to the remaining crystallinity) was measured by DSC according to the above outlined TA test procedure (ASTM D-3417). Chlorination temperature and pressure, particle size of the polyethylene powder, chlorination time, chlorine content, enthalpy of fusion of the starting polyethylene, enthalpy of fusion of the resulting chlorinated polyethylene, and the % residual crystallinity ($\Delta H_{CPE}/\Delta H_{PE}$) are indicated in the following table.

TABLE I

Effect of Process Variables

| Sample | Temperature (° C.) | Pressure (psia) | Particle Size ($\mu$m) | Reaction time (min) | Chlorine Content (wt. %) | $\Delta H_{PE}$ (J/g) | $\Delta H_{CPE}$ (J/gPE) | $\dfrac{\Delta H_{CPE}}{\Delta H_{PE}}$ (%) |
|---|---|---|---|---|---|---|---|---|
| 5A | 50 | 50 | 250 | 360 | 50 | 161 | 155 | 96 |
| 5B | 70 | 50 | 250 | 226 | 52 | 169 | 105 | 62 |
| 5c | 90 | 50 | 250 | 150 | 52 | 169 | 104 | 62 |
| 5D | 70 | 80 | 250 | 256 | 50 | 169 | 103 | 61 |
| 5E | 50 | 50 | 20 | 190 | 50 | 150 | 105 | 70 |
| 5F | 70 | 50 | 500 | 262 | 49 | 169 | 109 | 64 |

Example 5 illustrates that as the reaction temperature increases, the residual crystallinity of the chlorinated polyethylene (as previously defined) decreases.

Example 6
Chlorinated Polyethylene, Effect of Density of Starting Material

Essentially the procedure of Example 1 was used where 300 g of various polyethylene powders of densities varying from 0.924 to 0.963 g/cm$^3$ were chlorinated with ca. 400 cm$^3$ of liquid chlorine under similar conditions. Chlorine contents were measured by $^{13}$C-NMR as described previously and the enthalpies of fusion correlating to the remaining crystallinity were measured by DSC according to the above outlined TA test procedure (ASTM D-3417). Polyethylene density and melt index, reactor pressure and temperature, chlorination time, overall chlorine content, enthalpy of fusion of the starting polyethylene, enthalpy of fusion of the resulting chlorinated polyethylene, and the % residual crystallinity are summarized in the following table.

TABLE II

Effect of Density of Polyolefin

| Sample | PE Density (g/cm³) | PE Melt Index (g/10 min) | Pressure (psia) | Temp (° C.) | Chlorine Content (wt %) | Reaction Time (min) | $\Delta H_{PE}$ (J/g) | $\Delta H_{CPE}$ (J/g PE) | $\dfrac{\Delta H_{CPE}}{\Delta H_{PE}}$ (%) |
|---|---|---|---|---|---|---|---|---|---|
| 6A | 0.963[a] | 0.35 | 50 | 50 | 50 | 360 | 161 | 155 | 96 |
| 6B | 0.953[b] | 10.5 | 50 | 49 | 50 | 190 | 150 | 105 | 70 |
| 6C | 0.945[c] | 4 | 50 | 80 | 50 | 260 | 159 | 74 | 46 |
| 6D | 0.940[d] | 3.5 | 50 | 80 | 48 | 310 | 154 | 51 | 33 |
| 6E | 0.924[e] | 6 | 50 | 60 | 54 | 240 | 111 | 9 | 8 |

(a) HDPE 9602 from Chevron Chemical. Pellets were ground to an average particle size of ca. 250 µm.
(b) Microthene™ FA-700-00 from Quantum Chemical. Spherical particles powder of average particle size of ca. 20 µm.
(c) Microthene™ MA-795-000 from Quantum Chemical. Mechanically ground to pass through a 50 mesh screen (average particle size of 200 µm).
(d) Microthene™ MP-643-661 from Quantum Chemical. Mechanically ground to pass through a 50 mesh screen (average particle size of 200 µm).
(e) Microthene™ MN-722-00 from Quantum Chemical. Mechanically ground to pass through a 50 mesh screen (average particle size of 200 µm).

Example 6 illustrates that as the starting crystallinity goes down (as indicated by decreases in density), the amount of residual crystallinity in the chlorinated polyethylene decreases substantially. Sample 6E shows a material outside the scope of the invention.

Example 7
Chlorinated Polyethylene (Scale-up)

An externally jacketed 200-gallon reactor, equipped with a flat blade turbine made of titanium, is charged with 1188 lb of water into which 100 lb of high density polyethylene powder (Fortiflex™ G60-25-144) from Solvay, having a density of 0.960 g/cm³ and a melt index of 0.25 g/10 min (ASTM D-1238 FR-E) and 45 g of a commercial wetting agent (Thompson-Hayward T-DET-N8). The original polyethylene pellets were commercially ground to pass through a 50 mesh screen. The temperature of the system was brought to 50° C. while the slurry was mixed at a speed of 125 rpm. Nitrogen was then added until the pressure reached 66 psia. The pressure of the reactor was decreased to 2.0 psia. Liquid chlorine was added to the reactor until the pressure within the reactor reached about 50 psia, then UV irradiation was started. This pressure was maintained while the temperature remained at 50° C., by feeding chlorine on demand until 66 lb of chlorine were fed. The total chlorine addition was accomplished in about 25 minutes. The chlorine supply was then shut off but the UV lights were left on so that most of the chlorine reacted with the HDPE resin. The lights were turned off when the pressure of the reactor reached 3.1 psia after a total reaction time of 194 minutes, indicating that the chlorination was complete. The contents of the reactor were then discharged to a centrifuge, washed and dried, as is conventionally done. The chlorine content was measured by $^{13}$C-NMR as described previously and found to be 27 wt. %. The residual crystallinity was measured by DSC according to the above outlined TA test procedure (ASTM D-3417) and found to be 99% of the starting polyethylene crystallinity (Example 7a). In a similar manner a larger amount of chlorine was charged to produce an Example 7b with 36 wt. % chlorine and 85 % of the starting polyethylene crystallinity.

Example 8
Chlorinated Polyethylene, Gas Phase Chlorination

A 1-liter jacketed reactor provided with means of agitation, gas feed lines, pressure and temperature recordings, was charged with 50 g of a finely divided high density polyethylene particles (HDPE 9708 ground to 120 µm average particle size), purchased from Chevron Chemical, having a density of 0.962 g/cm³ (ASTM D-4683) and a melt index of 8.0 g/10 min (ASTM D-1238 FR-E). The temperature of the reactor was brought to 70° C. and the agitation was turned on to provide an adequate anhydrous suspension of the polyethylene particles in the reactor. Oxygen was eliminated by means of successive vacuum and nitrogen purges. Gaseous chlorine was added and UV irradiation was turned on. Chlorine was added at a constant feed rate until a total weight of 55 g of gaseous chlorine was fed. The reaction was carried out at a constant atmospheric pressure and was continued until a vacuum was developed, indicating the essential total consumption of chlorine. The UV lights were then turned off and the reactor was cooled down to room temperature. The total reaction time was 126 minutes. The chlorine content was measured by $^{13}$C-NMR as described previously and found to be 32 wt. %. The residual crystallinity was measured by DSC according to the above outlined TA test procedure (ASaM D-3417) and found to be 92% of the starting polyethylene crystallinity.

Example 8 illustrates that particulate polyethylene can be chlorinated to result in a blocky structure using a gas (chlorine) as the media.

Example 9
(Chlorinated Polyethylene According to Teachings of Journal Article)

A high density polyethylene supplied by Chevron Chemical (HDPE 9602) was used to reproduce the work published by Hiltner et al. (Polymer and Engineering and Science, 1988, vol. 28, n 18, pp. 1167–1181), where a similar grade polyethylene was chlorinated in suspension in 1,1,2,2-tetrachloroethane (TCE). The results can be distinguished from those produced by the water-slurry process described previously in Example 1. The polyethylene used in the article had weight and number average molecular weight of $2.8 \times 10^5$ and $4 \times 10^4$ g/mol respectively by GPC. In a typical suspension chlorination in TCE, 25 g of the dried polyethylene powder (250 µm average particle size) was placed in a three-neck reaction flask with 750 ml of certified reagent grade 1,1,2,2-tetrachloroethane. The 2-liter jacketed reactor was equipped with appropriate nitrogen and chlorine inlets, UV lamps and mechanical agitation. The reaction was carried out under ultraviolet radiation at 60° C. and atmospheric pressure with a constant flow of gaseous chlorine. After the desired reaction time, the reaction was quenched in a large volume of methanol. The resulting polymer was filtered, washed several times with methanol and vacuum dried at 60° C. for one week. The chlorine content was determined by $^{13}$C-NMR as described previously. The most characteristic property of the chlorinated polyethylenes synthesized in the water-slurry process is the extent of their blockiness which is correlated by their substantial residual crystallinity as previously defined. The results comparing our water-slurry process (curve A) and TCE suspension process (curve C) are plotted in FIG. 1. The results from Hiltner et al. are plotted as curve B. The steady decrease in crystallinity with increasing chlorine content in the case of the TCE suspension chlorination (curve C) is in agreement with the literature work (curve B) although the values of residual crystallinity varies. In the case of our water-slurry process (curve A), more than 90% of the original PE crystallinity is retained even at high chlorine level (up to 42 wt. % chlorine), indicating the true blockiness nature.

The best linear fits for the curves are: curve A, residual crystallinity $\%\Delta H_R = -0.097 \times (\%Cl) + 100$; curve B, residual crystallinity $\%\Delta H_R = -0.068 \times (\%Cl)^2 + 2.59 \times (\% Cl) + 73.71$; and curve C, residual crystallinity $\%\Delta H_R = 0.029 \times (\%Cl)^2 - 3.45 \times (\% Cl) + 141.56$. As applicants desire residual crystallinity in excess of that in the literature (curve B) they desire to claim residual crystallinity (as previously defined) of equal to and/or in excess of that of curve B+1% or $\%\Delta H_R = -0.068 \times (\%Cl)^2 + 2.59 \times (\%Cl) + 74.71$, more desirably equal to and/or in excess of curve B+2% or $\%\Delta H_R = -0.068 \times (\%Cl)^2 + 2.59 \times (\%Cl) + 75.71$, and preferably equal to and/or in excess of curve B+5% or $\%\Delta H_R = -0.076 \times (\%Cl)^2 + 3.16 \times (\%Cl) + 68$. $\%\Delta H_R = (\Delta H_{CPE}/\Delta H_{PE}) \times 100$ Additionally, the chlorinated polyethylene samples were analyzed by gas chromatography for the detection of VOC (volatile organic compounds) such as residual tetrachloroethane (TCE) and pentachloroethane (PCE) in the polymer. Each sample was first dissolved in decahydronaphtalene at 140° C. and then the polymer was precipitated by slowly cooling to room temperature. The supernatant was then analyzed by directly injecting 0.2 ml into a Hewlett Packard 5890A GC equipped with an electron capture detector and a 30 m by 0.53 mm fused-silica packed column coated with 1.2 μm SE30. Relative response factors were determined by analyzing samples of decahydronaphtalene containing known amounts of the TCE and PCE. The results are summarized in the following table.

Applicants desire the residual tetrachloroethane and pentachloroethane both be less than 150 ppm in the resin, more desirably less than 10 or 50 ppm and preferably less than 1 or 5 ppm.

TABLE III

Analysis of Residual Chlorinated VOC

| SAMPLE | TCE (ppm in resin) | PCE (ppm in resin) |
|---|---|---|
| Water-Slurry Example 7a (27 wt % Cl) | ND[a] | NA[b] |
| Water-Slurry Example 7b (36 wt % Cl) | ND[a] | NA[b] |
| TCE Suspension Example 9a (31 wt % Cl) | 200 | 500 |
| TCE Suspension Example 9b (32 wt % Cl) | 460 | 540 |

[a]: Not Detected (<0.1 ppm)
[b]: Negligible Amount (<1.0 ppm)

Example 10
(Blends of PVC, Chlorinated Polyethylene and Polyolefin Elastomer)

Blends of Geon® PVC 103EPF76-TR (I.V.=0.92) and 110×440 (I.V.=0.68) from the Geon Company, polyolefin elastomers (POE) and block chlorinated polyethylene (b-CPE) used as a compatibilizer were formulated according to the following recipe:

| PVC | | 100 phr |
|---|---|---|
| Stabilizer | Dibutyltin bis-thioglycolate | 1.5 phr |
| Lubricant | Calcium Stearate | 0.8 phr |
| Lubricant | Ethylene bis-stearamide | 1 phr |
| Processing aid | Paraloid ™ K120ND | 2 phr |
| Pigment | Titanium dioxide | 5 phr |
| Impact Modifier | POE (EP, EPDM . . .) | 5 to 10 phr |
| Compatibilizer | b-CPE | 0 to 4 phr |

The ingredients were combined on a two-roll mill and melt-mixed at 196° C. (385° F.) for a total time of ca. 15 min. The hot material was sheeted directly off the mill and plaques were cut from the sheets. The plaques were then pressed to a preset thickness at 193° C. (380° F.) under 50 tons. The compression molded samples were then annealed at 50° C. (122° F.) for 24 hours. Samples were cut to various configurations required for ASTM testing methods.

The results obtained with the rubber-modified PVC blends were compared to a standard where the POE/b-CPE combination was replaced by 10 phr of a very efficient PVC impact modifier, Paraloid™ KM334 from Rohm and Haas. Typical Notched Izod values of that standard impact modifier in Geon® PVC 103EPF76-TR (I.V.=0.92) and 110×440 (I.V.=0.68), were in average 3.5±0.5 ft-lb/in and 2.5±0.5 ft-lb/in respectively.

Notched Izod impact values in blends of 100 phr Geon® PVC 103EPF76-TR (I.V.=0.92), 10 phr of various POEs and 2 phr of b-CPE of various molecular weight and chlorine content were measured on ¼" compression molded bars, as illustrated in Table IV. As a reference, 10 phr of POE without b-CPE gave values of Notched Izod typically below 2 ft-lb/in.

TABLE IV

Effect of Rubber Type, Melt Viscosity of the Polyolefin and % Chlorine of b-CPE

| Sample | POE Type | POE Melt Viscosity[a] | HDPE Melt Index[b] (g/10 min) | b-CPE Chlorine Content (wt. %)[c] | Notched Izod Impact[d] (ft-lb/in) |
|---|---|---|---|---|---|
| 10a | 6520z[e] | 62 | 8[i] | 23 | 12.6 ± 0.8 |
| 10b | | | | 26 | 14.2 ± 0.9 |
| 10c | | | | 33 | 9.8 ± 5.3 |
| 10d | | | | 38 | 5.5 ± 0.8 |
| 10e | | | | 49 | 3.6 ± 0.3 |
| 10f | EG8150[f] | 35 | 0.35[j] | 23 | 15.8 ± 1.5 |
| 10g | | | | 30 | 14.6 ± 1.4 |
| 10h | | | | 35 | 14.6 ± 0.8 |
| 10i | | | | 37 | 12.4 ± 4.7 |
| 10j | | | | 47 | 3.5 ± 0.4 |
| 10k | EG8150 | 35 | 0.14[k] | 27 | 6.7 ± 5.7 |
| 10l | | | | 31 | 11.1 ± 6.2 |
| 10m | | | | 40 | 8.4 ± 5.9 |
| 10n | | | | 46 | 3.2 ± 0.7 |
| 10o | EPM 306[g] | 22 | 0.35[j] | 30 | 13.3 ± 1.2 |
| 10p | | | | 35 | 12.0 ± 1.3 |

TABLE IV-continued

Effect of Rubber Type, Melt Viscosity of the Polyolefin and % Chlorine of b-CPE

| Sample | POE Type | POE Melt Viscosity[a] | HDPE Melt Index[b] (g/10 min) | b-CPE Chlorine Content (wt. %)[c] | Notched Izod Impact[d] (ft-lb/in) |
|---|---|---|---|---|---|
| 10q | 1446a[h] | 10 | 0.35 | 30 | 14.6 ± 1.6 |
| 10r | | | | 35 | 15.2 ± 0.6 |

[a]Mooney viscosity measured ML 1 + 4 @125° C., ASTM D-1646/ISO289
[b]ASTM D-1238 FR-E
[c]Determined by $^{13}$C-NMR as previously described
[d]ASTM D-256-93a, 0.25 in compression molded bars, 22° C.
[e]Keltan ® EPDM 6520z Elastomer from DSM, 67 wt. % Ethylene comonomer, 2.4 wt. % Ethylidene Norbornene termonomer
[f]Engage ™ EG8150 from Dow Plastics, saturated Ethylene-Octene elastomer, 75 wt. % Ethylene comonomer, 25 wt. % Octene comonomer
[g]Polysar EPM 306 from Bayer Corporation, 68 wt. % Ethylene comonomer, 32 wt. % Propylene comonomer
[h]Keltan ® EPDM 1446a elastomer from DSM, 58 wt. % Ethylene comonomer, 7 wt. % Ethylidene Norbornene termonomer
[i]Based on High Density Polyethylene 9708 from Chevron Chemical Company, Density = 0.962 g/cm$^3$ (ASTM D-4683)
[j]Based on High Density Polyethylene 9602 from Chevron Chemical Company, Density = 0.963 g/cm$^3$ (ASTM D-4683)
[k]Based on High Density Polyethylene Petrothene ® LB 830 from Quantum Chemical Corporation, Density >0.957 g/cm$^3$ (ASTM D-4683)

The system will also be process sensitive. One skilled in the art, based on this data and some routine experimentation, will be able to optimize properties. This data is limited to mill mixed samples which were compression molded. Extruder mixed samples will vary due to different shear mix histories.

Example 11
Blends of PVC, Chlorinated Polyethylene and Polyolefin Elastomer

In manner similar to that described previously, Notched Izod values were measured in blends of 100 phr Geon® PVC 103EPF76-TR (I.V.=0.92), 5 to 10 phr of POE (EPM 306) and 0 to 4 phr of a b-CPE containing 38 wt. % Cl determined by $^{13}$C-NMR as described previously. The based polyethylene for the b-CPE was a high density polyethylene (HDPE 9708) from Chevron Chemical, having a density= 0.962 g/cm$^3$ (ASTM D-4683) and a Melt index=8.0 g/10 min (ASTM D-1238 FR-E). Results are summarized in Table V.

TABLE V

Effect of Relative Amounts of Elastomer and Compatibilizer

| | POE Content EPM 306 (phr) | b-CPE Content (phr) | Notched Izod Impact (ft-lb/in) |
|---|---|---|---|
| 11a | 5 | 0 | 1.6 ± 0.1 |
| 11b | 5 | 1 | 1.3 ± 0.1 |
| 11c | 5 | 2 | 1.5 ± 0.3 |
| 11d | 5 | 4 | 1.6 ± 0.1 |
| 11e | 10 | 0 | 1.3 ± 0.2 |
| 11f | 10 | 1 | 3.2 ± 0.1 |
| 11g | 10 | 2 | 6.9 ± 4.8 |
| 11h | 10 | 4 | 7.2 ± 3.9 |

Randomly chlorinated polyethylene (e.g. Dow Chemical Tyrin™ 3611, 3615p, . . . ) was used in blends of PVC and polyolefin elastomers as just shown. The impact properties on compression molded bars showed relatively high Notched Izod values (comparable to the blocky CPE) but strips extruded using a single screw brabender showed very low VHIT (variable height impact test) values with a brittle failure mechanism. Similar blends with b-CPE showed higher VHIT values indicating better adhesion between phases. Scanning electron microscopy (SEM) showed that the Tyrin type CPE helped to disperse the immiscible POE phase in small domains in the PVC matrix without providing adhesion between the two phases. In comparison, using b-CPE in lieu of Tyrin provided dispersion and adhesion of the two immiscible phases, as shown in the SEM micrographs.

Example 12
Blends of CPVC Chlorinated Polyethylene, and Polyolefin Elastomer

In manner similar to that described in Example 10, blends of CPVC resin per U.S. Pat. No. 5,340,880 (I.V.=0.92, 67 wt. % Cl), POE and b-CPE used as a compatibilizer were formulated according to the following recipe:

| CPVC | | 100 phr |
|---|---|---|
| Stabilizer | Dibutyltin bis-thioglycolate | 3.0 phr |
| Lubricants | Oxidized Polyethylene and paraffin wax | 1 phr (0.5 phr each) |
| Antioxidant | Irganox ™ 1010 | 0.5 phr |
| Pigment | Titanium dioxide | 5 phr |
| Impact Modifier | POE (EP, EPDM . . .) | 5 to 10 phr |
| Compatibilizer | b-CPE | 0 to 4 phr |

The ingredients were combined on a two-roll mill and melt-mixed at 215° C. (420° F.) for a total time of ca. 15 min. The hot material was sheeted directly off the mill and plaques were cut from the sheets. The plaques were then pressed to a preset thickness at 210° C. (410° F.) under 50 tons. The compression molded samples were then annealed at 115° C. for 24 hours. Samples were cut to various configurations required for ASTM testing methods.

In this example, Notched Izod values were measured in blends of 100 phr CPVC (I.V.=0.92, 67 wt. % Cl), 10 phr of a POE (EPM 306) and 0 to 4 phr of b-CPE of various characteristics (i.e. various HDPE type, density and melt index and chlorine content) as described in Table VI. The results obtained with the POE-modified CPVC blends were compared to a standard where the POE/b-CPE combination was replaced by 10 phr of a standard CPVC impact modifier, polyorganosiloxane Metablen™ S-2001, manufactured by Mitsubishi Rayon Co. and available from Metco North America. Typical Notched Izod values of that standard impact modifier were in average 5.0±11.5 ft-lb/in.

TABLE VI

Blends of CPVC, Chlorinated Polyethylene and a Polyolefin Elastomer

| Sample | HDPE Type | HDPE Density (g/cm$^3$) | HDPE Melt Index (g/10 min) | b-CPE Chlorine Content (wt %) | b-CPE Content (phr) | Notched Izod Impact (ft-lb/in) |
|---|---|---|---|---|---|---|
| 12a | LB 830 | >0.957 | 0.14 | 27 | 0 | 1.1 ± 0.2 |
| 12b | | | | | 4 | 3.1 ± 0.6 |
| 12c | | | | 31 | 0 | 1.1 ± 0.2 |
| 12d | | | | | 4 | 4.1 ± 0.8 |
| 12e | | | | 40 | 0 | 0.8 ± 0.1 |
| 12f | | | | | 4 | 2.9 ± 0.5 |
| 12g | | | | 46 | 0 | 1.1 ± 0.2 |
| 12h | | | | | 4 | 3.3 ± 0.1 |
| 12i | 9708 | 0.962 | 8 | 33 | 0 | 0.8 ± 0.1 |
| 12j | | | | | 2 | 2.9 ± 0.8 |

TABLE VI-continued

Blends of CPVC, Chlorinated Polyethylene and a Polyolefin Elastomer

| Sample | HDPE Type | HDPE Density (g/cm³) | HDPE Melt Index (g/10 min) | b-CPE Chlorine Content (wt %) | b-CPE Content (phr) | Notched Izod Impact (ft-lb/in) |
|---|---|---|---|---|---|---|
| 12k |  |  |  | 51 | 0 | 1.1 ± 0.1 |
| 12l |  |  |  |  | 2 | 1.1 ± 0.2 |

Example 13
Blends of CPVC, Chlorinated Polyethylene, Polyolefin Elastomer and a Randomly Chlorinated Polyethylene In an analogous manner as described in Example 12, Notched Izod values were measured in blends of 100 phr CPVC (I.V.=0.92, 67 wt. % Cl), 10 phr of various POE with different compositions and Mooney viscosities, 0 to 4 phr of b-CPE based on HDPE Fortiflex™ G60-25-144 from Solvay, having a density of 0.960 g/cm³ and a melt index of 0.25 g/10 min (ASTM D-1238 FR-E), and containing 36 wt. % chlorine as determined by $^{13}$C-NMR, and 0 to 2 phr of Tyrin 3615p (Dow Chemical). The results are summarized in Table VII.

TABLE VII

Blends of CPVC, Blocky Chlorinated Polyethylene, POE and Randomly Chlorinated Polyethylene

| Sample | POE Type | POE Mooney Viscosity | b-CPE Content (phr) | Tyrin 3615p Content (phr) | Notched Izod Impact (ft-lb/in) |
|---|---|---|---|---|---|
| 13a | EPM 306 | 22 | 0 | 0 | 0.9 ± 0.2 |
| 13b |  |  | 4 | 0 | 3.1 ± 0.5 |
| 13c |  |  | 4 | 0.5 | 3.8 ± 1.3 |
| 13d |  |  | 4 | 1 | 4.8 ± 0.2 |
| 13e |  |  | 4 | 2 | 5.4 ± 0.3 |
| 13f | 6520z | 62 | 0 | 0 | 0.6 ± 0.1 |
| 13g |  |  | 4 | 0 | 4.6 ± 1.1 |
| 13h |  |  | 4 | 0.5 | 6.0 ± 1.4 |
| 13i |  |  | 4 | 1 | 7.1 ± 1.0 |
| 13j |  |  | 4 | 2 | 7.2 ± 0.5 |

Tyrin 3615p, a randomly chlorinated polyethylene, is a high molecular weight material relative to other Tyrins and is believed to give better Notched Izod properties. High molecular weight randomly chlorinated polyethylenes are preferred over their lower molecular weight counterparts (when used) in combination with the blocky chlorinated polyethylenes.

Based on the interpretation of Scanning Electron Micrographs of these blends, the presence of Tyrin 3615p provides better dispersion of the rubber phase in the immiscible CPVC matrix, with higher efficiency when higher molecular weight Tyrin materials are used.

While in accordance with the patent statutes the best mode and preferred embodiment has been set forth, the scope of the invention is not limited thereto, but rather by the scope of the attached claims.

What is claimed is:

1. A process for making a blocky chlorinated polyolefin comprising:

a) reacting a particulate semi-crystalline polyolefin having a density of from about 0.94 to 0.98, and a melt index from about 0.01 to about 40 g/10 min. with liquid or gaseous chlorine at a temperature from about 40 to about 100° C.; optionally in the presence of a free radical source, catalyst, or UV radiation; in a liquid media until the bound chlorine content of said polyolefin is from about 10 to about 60 wt. %, wherein the media causes an equilibrium swelling of said polyolefin before chlorination of less than 10% volume increase at 25° C. over its unswollen volume and said solvent is not a chlorinated solvent.

2. Process of claim 1, wherein said media is water.

3. A process for making a blocky chlorinated polyolefin comprising:

a) reacting particulate polyolefin having a density of from about 0.94 to 0.98, and a melt index from about 0.01 to about 40 g/10 min. with liquid or gaseous chlorine at a temperature from about 40 to about 100° C.; optionally in the presence of a free radical source, catalyst, or UV radiation; in a media to obtain a chlorinated polyolefin having an amorphous phase and a crystalline phase wherein said chlorinated polyolefin contains bound chlorine (%Cl) in an amount of from about 20 to about 50 weight percent based upon the weight of said chlorinated polyolefin, wherein said chlorinated polyolefin has a residual crystallinity equal to or greater than $-0.068\times(\%Cl)^2+2.59\times(\%Cl)+74.71$, wherein-said % Cl is weight percent bound chlorine in the chlorinated polyolefin, and wherein said chlorinated polyolefin has a melting temperature of from about 110° C. to about 140° C. when measured by differential scanning calorimetry, and wherein the media causes an equilibrium swelling of said polyolefin before chlorination of less than 10% volume increase at 25° C. over its unswollen volume and said solvent is not a chlorinated solvent.

4. A process according to claim 3, wherein said reacting step is conducted in a particulate reactor wherein the media is a gas rather than a liquid at the temperature and pressure of reacting.

5. The process according to claim 3, wherein the media is liquid.

6. The process according to claim 5, wherein the media is water.

7. The process according to claim 1, 2, 4, 3, 5, or 6 wherein the polyolefin is polyethylene.

* * * * *